UNITED STATES PATENT OFFICE 2,403,088

METHOD OF TREATING OILS

Kenneth Malcolm Laing, New Kensington, Pa., assignor to Aluminum Company of America, Pittsburgh, Pa., a corporation of Pennsylvania No Drawing. Application October 25, 1943, Serial No. 507,642

2 Claims. (Cl. 196—147)

This invention relates to methods of treating vegetable and mineral oils, particularly lubricating oils, by means of adsorbents. The invention is also directed to new and improved adsorbents for that purpose and to methods involving their use.

Aluminum hydrates such as mono- and trihydrates, and alumina in gelatinous form having a proportion of free or loosely held water associated with it, develop adsorptive properties (i. e. are "activated") when heated at relatively high temperatures such as those in the range of 250 to 800° C. After the resultant bodies have been used as adsorbents the adsorbed material can be removed from them, usually by heating at a temperature sufficient to drive off the adsorbed material or by washing or other means, the result in any event being to again render the bodies active and suitable for further adsorption. For convenience such activated and reactivated bodies are referred to herein, and defined in the appended claims, as "Activated Alumina."

When Activated Alumina is used in the treatment of oil to remove foreign substance or contamination therefrom, such as for example in the reclaiming of contaminated or waste lubricating or transformer oils, the Activated Alumina tends to increase the ability or propensity of the oil to emulsify with water. This disadvantageous effect is apparently obtained at all times, being more pronounced in some instances than in others and thus presents an operating difficulty of unpredictable degree and extent.

Among the objects of this invention is the provision of methods by which oil may be treated with adsorbent containing Activated Alumina, whereby the tendency of that substance to increase the emulsifying ability of the oil will be minimized as well as controlled. A further object is to provide new and improved adsorbents containing Activated Alumina.

One accepted measurement of the tendency of an oil to emulsify with water is the steam emulsion number of the oil as determined by the method designated as D157–36 which is specifically described in the publication entitled "American Society for Testing Materials Standards on Petroleum Products and Lubricants" for the year 1942. Briefly, the method involves the emulsification of a specified volume of oil by the passage of a jet of steam therethrough. The resultant emulsion is then allowed to stand quiescent at a controlled temperature, the number of seconds required for the separation of a specified volume of the oil representing the Steam Emulsion number (hereinafter referred to as the S. E. number). All values for this number herein referred to were determined in accordance with said method D157–36. It will be understood that such measurements are quantitative only to a degree and are often relied upon only as being indicative of the result.

In broad outline, and without regard to varying mechanical and process detail, all of which is well known in the art, the process which this invention seeks to improve comprises contacting an oil with adsorbent, removing the oil from the adsorbent or the adsorbent from the oil, and thereafter, if desirable and economically feasible, treating the adsorbent to remove adsorbed substances (i. e. reactivating it) and again using it in the treatment of more oil. Such processes, when Activated Alumina is used, improve the oil, usually in the sense of reducing acidity and water content, although other contaminating or unwanted substances may likewise be removed.

One characteristic of a used oil is that its ability of emulsifying with water is usually increased over that of the original or new oil. In other words, use increases the S. E. number. It is highly desirable, therefore, to provide means by which an Activated Alumina adsorbent may be used to effect its highly efficient purification of the oil without increasing or, at least without largely increasing, the tendency of the oil to emulsify with water.

This invention provides a new Activated Alumina adsorbent composed of Activated Alumina, as above defined, and fuller's earth in a ratio of at least equal parts of said substances up to a ratio of 10 parts of Activated Alumina to 1 part of fuller's earth. Such an adsorbing body will, I have discovered, perform the normal functions of Activated Alumina without materially increasing the S. E. number of the oil under treatment. In fact in many cases the S. E. number of the treated oil will be reduced, the reduction often being in such amount as to produce an oil having the emulsifying characteristics of a new oil. The amount of the adsorbing body used in the treatment of the oil should, of course, be appreciable, but the amounts to be used may be governed essentially by considerations of speed of purification, the mechanical aspects of the processing, cost and similar factors all of which are well known and form no part of this invention.

The adsorbing body composed of Activated Alumina and fuller's earth may be formed of a simple mixture of those components or may be mixed and briquetted or otherwise pressed into convenient form for handling. An example of the efficiency of my new adsorbent is given in the following tabulation, the various oils there mentioned being samples of different used transformer oils. Treatment in Tests 1 and 2 utilized an amount of the indicated adsorbent body equal to 15 per cent. by weight of the oil being treated while in Test 3 the amount used was equal to 7 per cent. by weight of the oil treated.

| Ratio of Activated Alumina to fuller's earth in adsorbing body | Steam emulsion number values before and after treatment |||||||||| Test number |
|---|---|---|---|---|---|---|---|---|---|---|---|
| | Oil #1 || Oil #2 || Oil #3 || Oil #4 || Oil #5 || |
| | Before | After | Before | After | Before | After | Before | After | Before | After | |
| 1:1 | 140 | 30 | 61 | 30 | 1,200 | 1,200 | 80 | 30 | 90 | 30 | 1 |
| 2:1 | 140 | 37 | 61 | 30 | 1,200 | 1,200 | 80 | 30 | 90 | 30 | 2 |
| 5:1 | 140 | 100 | 61 | 54 | No test || 80 | 75 | 90 | 70 | 3 |

By a "used oil," I mean an oil which after refining has had some use. I do not by such term, or the description, intend to limit the use of my new adsorbent product to the methods herein claimed, since the product may even be useful in processes concerned with the refining of crude but unused oil as well as for other purposes in the art.

Having thus described my invention, I claim:

1. The method of treating oils which comprises contacting the oil with an adsorbent composed of alumina and fuller's earth proportioned in ratio of not less than about 1 and not more than about 10 parts of alumina to 1 part of fuller's earth, said alumina being an adsorptive product prepared by heating within the range of 250 to 800° C. a substance selected from the group consisting of aluminum hydrates and alumina in gelatinous form containing free or loosely held water.

2. The method of treating oils which comprises contacting the oil with an adsorbent composed of alumina and fuller's earth proportioned in ratio of not less than about 1 and not more than about 5 parts of alumina to 1 part of fuller's earth, said alumina being an adsorptive product prepared by heating within the range of 250 to 800° C. a substance selected from the group consisting of aluminum hydrates and alumina in gelatinous form containing free or loosely held water.

KENNETH MALCOLM LAING.